United States Patent

[11] 3,563,259

[72] Inventor Donnie R. Jones
 Silver Spring, Md.
[21] Appl. No. 713,480
[22] Filed Mar. 15, 1968
[45] Patented Feb. 16, 1971
[73] Assignee Bowles Engineering Corporation
 Silver Spring, Md.

[54] FLUIDIC LIQUID LEVEL SENSOR
 18 Claims, 3 Drawing Figs.

[52] U.S. Cl. ..................................................... 137/1,
 137/81.5
[51] Int. Cl. ........................................................ F15c 1/12
[50] Field of Search ........................................ 137/81.5,
 393, 453

[56] References Cited
UNITED STATES PATENTS

| | | | |
|---|---|---|---|
| 3,232,095 | 2/1966 | Symnosk et al. | 137/815X |
| 3,277,914 | 10/1966 | Manion | 137/393X |
| 3,335,746 | 8/1967 | Lebour | 137/393X |
| 3,363,641 | 1/1968 | Mylander | 137/393 |
| 3,396,619 | 8/1968 | Bowles et al. | 137/815X |
| 3,426,582 | 2/1969 | McArthur et al. | 137/815X |
| 3,433,238 | 3/1969 | Nightingale | 137/815 |
| 3,444,878 | 5/1969 | Mayer | 137/815 |
| 3,448,752 | 6/1969 | O'Neill | 137/815 |

FOREIGN PATENTS

| 44,456 | 11/1938 | Netherlands | 137/393 |
|---|---|---|---|

Primary Examiner—Samuel Scott
Attorney—Hurvitz, Rose & Greene

ABSTRACT: A fluidic liquid level sensor comprising a fluidic switching element which issues a stream of fluid from a first output passage through a sensor tube unless the sensor tube is blocked by the liquid level being sensed, in which case the stream of fluid issues through a second output passage. The second output passage is connected to the control nozzle of a monostable fluidic logic element, the latter providing a fluid output signal at either of two output passages as a function of the presence or absence of fluid at the control nozzle. The pressure of the stream of fluid issued to the sensor tube is maintained relatively low so as to prevent bubbling and perturbations in the liquid level being sensed as would otherwise be caused by high pressure fluid issuing from the sensor tube.

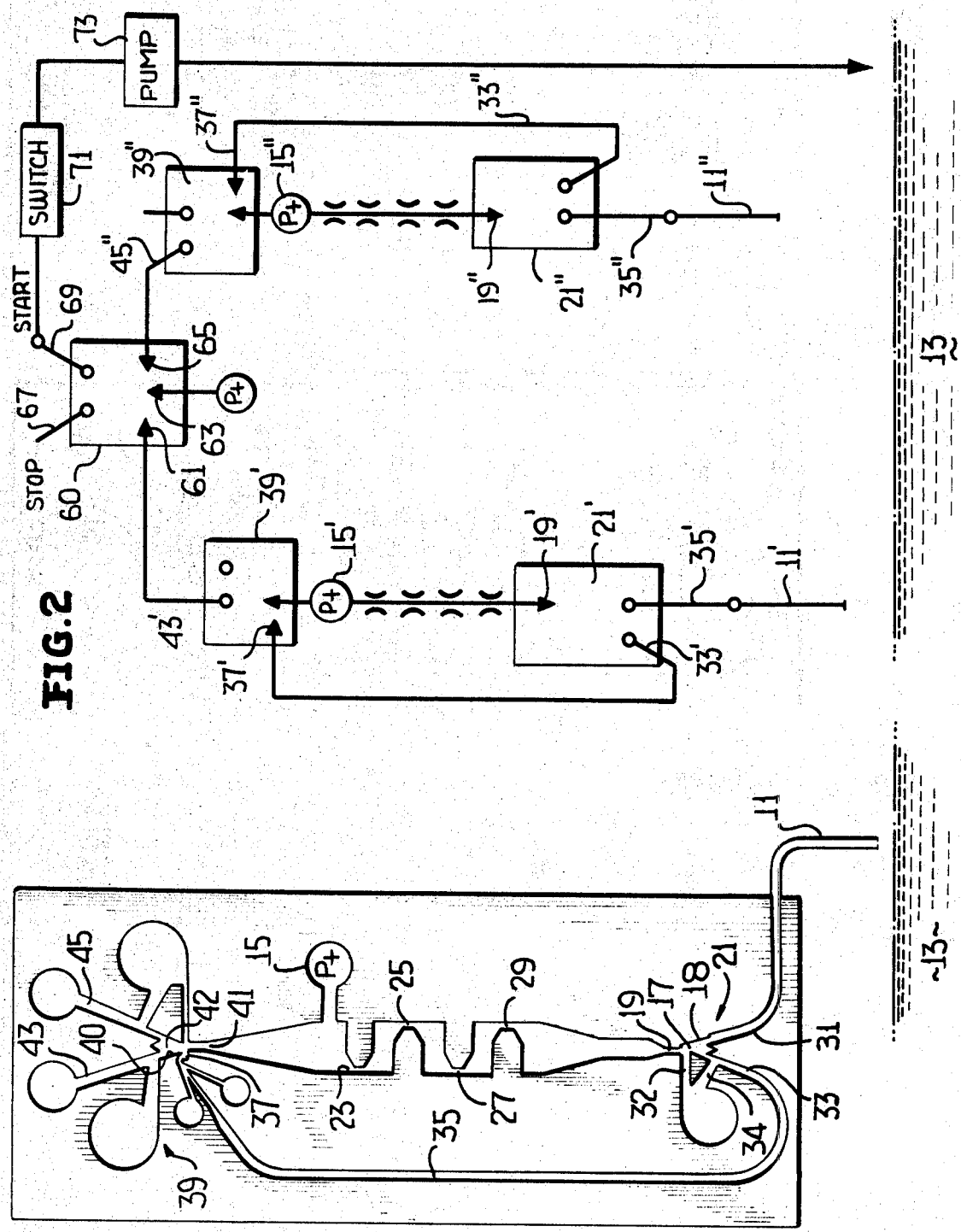

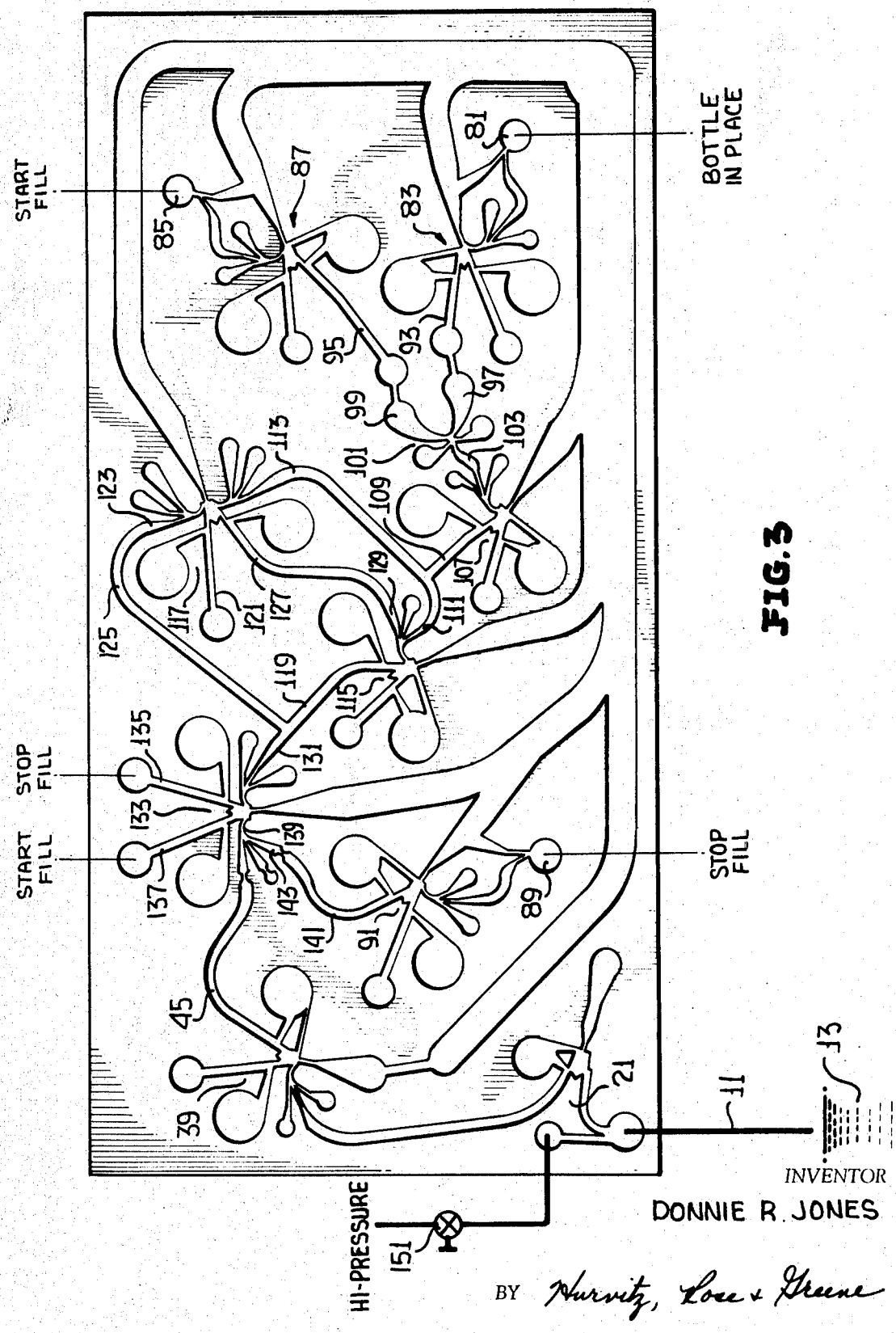

FLUIDIC LIQUID LEVEL SENSOR

BACKGROUND OF THE INVENTION

The present invention relates generally to fluidic pressure sensors and more particularly to fluidic liquid sensing systems.

Known approaches to liquid level sensing utilizing pure fluid components may be found in U.S. Pat. No. 3,267,949 to Adams and U.S. Pat. No. 3,277,194 to Manion. The devices disclosed in both of these patents employ a sensing tube having one end connected to the control nozzle of a monostable pure fluid switching device and the other end disposed in a tank to sense the liquid level therein. When liquid in the tank is below the level of the sensing tube, air from the tank is aspirated through the control nozzle by the power stream of the switching device so that the pressure in the region of the control nozzle is maintained close to ambient and the power stream locks on to the sidewall opposite the control nozzle. When the liquid level in the tank rises to the level of the tube, air from the tank can no longer be aspirated through the sensing tube; consequently, the power stream entrains air from the control nozzle and the pressure at the control nozzle drops sufficiently to cause the power stream to switch. These prior art devices are prone to take in fluid at the sensing end of the sensor tube rendering the sensor tube susceptible to clogging by dirt or objects floating in the liquid. Also if the liquid is flammable the intake of the region above the liquid can be dangerous.

In my prior copending Pat. application Ser. No. 490,246 filed Sept. 27, 1965, now U.S. Pat. No. 3,467,122, and entitled "Liquid level Sensor" there is disclosed a device which avoids the above problems. In said copending application a sensor tube is adapted to continuously discharge fluid toward the liquid being sensed unless blocked by the liquid. A two state pure fluid amplified is provided with a feedback path from one output passage to a control nozzle and a fluid passage is connected from the feedback path to the sensor tube so as to aspirate fluid from the control nozzle through the combined effects of the feedback signal and the fluid flow through the sensor tube. When the sensor tube is blocked aspiration ceases and pressure builds up in the control nozzle to deflect the amplified power stream. As long as the sensor tube remains blocked the amplifier remains in a state whereby no feedback or sensor tube flow acts to aspirate the control nozzle. However, when the sensor tube is unblocked, the combined aspiration action at the control nozzle, resulting from sensor tube flow and feedback flow, acts to return the pure fluid amplifier to its original condition.

While the device disclosed in my above-referenced copending patent application improves liquid level sensing reliability as compared with prior art devices, it presents another problem which, if corrected, could further improve liquid level sensing reliability. Specifically, the rate of flow of fluid through the sensor tube in my prior device must be sufficiently high to aspirate fluid from the amplifier feedback passage and control nozzle. Unfortunately, such flow rates produce perturbations and bubbling in the sensed liquid, the perturbations and bubbling becoming more pronounced as the liquid level approaches the sensing end of the sensor tube.

It is therefore an object of the present invention to provide a pure fluid liquid sensor having greater sensing reliabilities than is possible in prior art sensing devices.

It is another object of the present invention to provide a reliable fluidic liquid level sensor where the sensor tube is adapted to continuously discharged fluid unless blocked by the liquid level being sensed but wherein the discharged fluid does not itself contribute to unreliable operation of the sensing device.

It should be noted that the deice disclosed in aforesaid U.S. Pat. No. 3,467,122 has broader utilization than merely liquid level sensing. Specifically, said device may be utilized to provide a signal in response to a predetermined impedance to flow from the sensor tube. Thus, said device has general proximity detection capabilities above and beyond liquid level detection. The same broad applicability applied to the device of the present invention to be discussed herein below.

Therefore, it is still another object of the present invention to provide a reliable and efficient pure fluid device for sensing a predetermined impedance to fluid flow in a sensor tube.

SUMMARY OF THE INVENTION

In accordance with the present invention a sensor tube has one of its ends connected to an output passage of a monostable fluidic switching device. The switching device has a power nozzle which receives pressurized fluid at a quite low pressure level and normally issues a low pressure fluid stream through said output passage to the sensor tube. The fluid issuing from the sensor tube is at a sufficiently low pressure as not to produce significant disturbances in the liquid being sensed. A second output passage of the switching device is disposed to receive fluid from the power nozzle only upon development of a back pressure in the first mentioned output passage. Such back pressure as would be produced by blocking the sensor tube, causes the low pressure fluid stream to switch to the second output passage which in turn provides an input signal to an OR/NOR gate. The OR/NOR gate provides a NOR output signal when the sensor tube is not blocked and an OR output signal is response to sensor tube blockage. The OR/NOR gate output signals are at substantially higher pressure levels than the signals received at the output passages of the switching device; therefore the OR/NOR gate serves to amplify the extremely low level sensing signals produced by the switching device. On the other hand, the low level sensing signals do not produce disturbances which otherwise might cause inaccuracies in the sensing operation.

BRIEF DESCRIPTION OF THE DRAWINGS

The above and still further objects, features and advantages of the present invention will become apparent upon consideration of the following detailed description of one specific embodiment thereof, especially when taken in conjunction with the accompanying drawings, wherein:

FIG. 1 is a plan view of a pure fluid liquid level sensor constructed in accordance with the principles of the present invention; and FIG. 2 is a schematic diagram of a pure fluid system employing two sensors of the type illustrated in FIG. 1 to provide differing responses according as one or two sensors operate, this system being employed to maintain liquid level above one value, not above another; and FIG. 3 is a schematic diagram of a circuit employed in conjunction with the liquid level sensor of the present invention for automatically filling bottles sequentially positioned on a conveyor mechanism.

DESCRIPTION OF THE PREFERRED EMBODIMENT

Referring now specifically to FIG. 1 of the accompanying drawings, there is illustrated a sensor tube 11 which extends toward the surface of a body of liquid 13. Fluid under pressure is supplied by a source 15 to a power nozzle 19 in fluidic switching device 21. Switching device 21 may be generally similar to the OR/NOR gate described in U.S. Pat. No. 3,240,219 issue to E. M. Dexter and myself, the control nozzle in such device being eliminated for purposes of the element 21. A series of fluid restrictors, for instance, restrictors 23, 25, 27 and 29, are placed in series between source 15 and nozzle 19 in order to reduce the pressure of the fluid applied to nozzle 19. Power nozzle 19 normally issues a low pressure stream of fluid which locks on to a sidewall 18 of interaction region 17 of device 21 and is directed toward output passage 31 thereof. Sensor tube 11 is connected to output passage 31 so that fluid received by passage 31 is directed through sensor tube 11 generally toward the surface of the body of liquid 13. A second output passage 33 of switching device 21 is disposed to receive the fluid issued by nozzle 19 only when a back pressure develops in output passage 31 sufficient to block substantial fluid flow through the latter passage. In order to assure that the stream issued from nozzle 19 is directed to output passage 31 in the absence of a back pressure therein, vent passages 32 and 34 are provided. Vent passage 32 communicate at one end with the upstream end of interaction region 17 through sidewall 20 thereof. One end of vent passage 34 communicates with output passage 33. The other ends of both vent passages are connect to ambient pressure.

Output passage 33 communicates by means of fluid passage 35 with a control nozzle 37 in fluid logic element 39. Fluid logic element 39 is an OR/NOR gate which, for example, may be identical to the device disclosed in the above-referenced U.S. Pat. No. 3,240,219. Power nozzle 41 in OR/NOR gate 39 is connected to source 15 so as to normally issue a power stream of fluid which locks on to sidewall 40 of region 42 and is directed towards NOR output passage 43. Only in the presence of an input pressure signal at control nozzle 37 does the power stream become deflected so as to be received by OR output passage 45 of the OR/NOR gate. OR output passage 45 and interaction region 42 are appropriately vented to assure such operation.

In operation, the egress end of sensor tube 11 may either be immersed, remote from, or very close to the level of liquid 13. When the egress opening of sensor tube 11 is remote from liquid 13, a low pressure stream is issued from control nozzle 19 to output passage 31 and is exhausted in the ambient pressure region surrounding the egress orifice of sensor tube 11. There is no pressure signal provided at control nozzle 37 of OR/NOR gate 39 and therefore the power stream issuing from power nozzle 41 is directed towards the NOR output passage 43. When the egress orifice of the sensor tube 11 is very close to but not fully immersed in liquid 13, low pressure flow is maintained in sensor tube 11 sufficient to keep it clean and free of liquid 13 but insufficient to cause bubbling in the liquid. The impedance to flow through sensor tube 11 is greater in this condition than the condition where the liquid is remote from the sensor tube; however, the impedance is not sufficiently great to cause a back pressure in outlet passage 31 of such magnitude to effect switching of the low pressure stream to output passage 33. As the egress orifice of sensor tube 11 approaches closer and closer to the surface of liquid 13, the impedance to fluid flow through sensor tube 11 increases accordingly. However, due to the relatively low pressure of the fluid egressing from the sensor tube 11, bubbling of the liquid 13 at its surface is substantially minimized so as to have a negligible effect on switching device 21. Consequently, minimal self-generated disturbance is produced to detract from the reliability of the level sensor.

When the egress orifice of sensor tube 11 is entirely blocked, as for example when the egress orifice is wholly immersed in liquid 13, a sufficient back pressure develops in output passage 13 to deflect the stream issuing from nozzle 19 toward the output passage 33. Fluid received at output passage 33 is conducted via fluid passage 35 to control nozzle 37 at the OR/NOR gate. 39. Consequently the power stream at the OR/NOR gate 39 is deflected to the OR output passage 45, thereby providing a signal indicative of liquid 13 having achieved a predetermined level, namely the level of the egress orifice of sensor tube 11.

The transition range, which is created as the egress orifice of sensor tube 11 is approached by the surface of liquid 13, is crucial in the accurate measurement and control of liquid levels. It is in this region that the system is susceptible to erroneous switching due to the presence of bubbles or perturbations in the liquid level. However, the low pressure stream of fluid egressing from sensor tube 11 is sufficiently great to blow aside bubbles or perturbations occuring at the surface of liquid 13. On the other hand, the pressure of the fluid egressing from sensor tube 11 is sufficiently low as not to itself produce bubbles or perturbations in the liquid being sensed. Therefore, it is not until the egress orifice of sensor tube 11 is fully immersed in liquid 13 that a back pressure is, in fact, developed in output passage 31 to effectively switch the output signal at OR/NOR gate 39.

The working pressurized fluid provided by source 15 is preferably gaseous so as to be lighter than the liquid 13 and thereby avoid contamination of the liquid. In the preferred embodiment, the pressurized fluid is air.

In the actual construction of the system in accordance with the present invention, switching element 21 and OR/NOR gate 39 may be such that lock-on of the power jets to respective sidewalls exists when the jets issue from output passages 31 and 43 respectively. Therefore, unless a relatively strong control stream issues from control nozzle 37 and similarly unless a definite back pressure exists in output passage 31, no transfer of state in either device can be initiated and the system is substantially impervious to bubbling and perturbations. Under such circumstances partial blocking of sensor tube 11 is inadequate to transfer switching states of the devices. However, when necessary to particular system operations, the lock-on conditions can be weakened by various expedients, for example by appropriate angling of the sidewalls of devices 21 or 39. Switching sensitivity of devices 21 and 39 may therefore be adjusted accordingly.

The pressure of the stream issued from power nozzle 19 can be set according to the environment in which the system of FIG. 1 is to operate and the density of the liquid being sensed. It has been found where pressurized air is used as the fluid medium provided by source 15, and water is the liquid 13 being sensed, a source pressure of 10 p.s.i.g., reduced to 1 p.s.i.g. by restrictors 23, 25, 27 and 29, produced sensitive and reliable level detection. In such a system, the maximum pressure available at control nozzle 37 is about one-half p.s.i.g. The element 39 then must be of such a design as to able to switch a 10 p.s.i.g. stream with a one-half p.s.i.g. control signal where all pressures are in terms of total pressures.

In FIG. 2 there is illustrated schematically a system for controlling liquid level employing a pair of level sensors of the type illustrated in FIG. 1. The reference numerals employed in FIG. 2 are identical to those employed for like elements in FIG. 1 but are primed and double primed, respectively, to distinguish between the two sensors. The NOR output passage 43' from one sensor (hereinafter described as the low level sensor) is connected to a left control nozzle 61 in a pure fluid flip-flop 60. Flip-flop 60 has a right control nozzle 65 oppositely disposed to control nozzle 61 an a power nozzle 63 which is connected to a pressurized source of pressurized fluid. The power stream issued by nozzle 63 has two stable conditions wherein it is received by either left output passage 67 or right output passage 69 in accordance with which of control nozzles 65 and 61 was the more recent to issue a control stream. Control nozzle 65 is connected to OR output passage 45'' of OR/NOR gate 39'' in the other of the two level sensors (hereinafter described as the high level sensor).

In operation of the system of FIG. 2, assume the liquid 13 is at the level illustrated, i.e., below the levels of sensor tubes 11' and 11''. Restricted flow from pressure sources 15' and 15'' exhausts via sensor tubes 11' and 11'' respectively, and the NOR output passage 43' receives a fluid signal while OR output passage 45'' does not. The signal at NOR passage 43' is conducted to control nozzle 61 in bistable flip-flop 60. The power stream in flip-flop 60 is therefore directed toward output passage 69 where it activates a pressure operated switch 71 which in turn activates pump 73 so as to supply liquid to the liquid body 13.

The liquid level rises until the egress orifice in low level sensor tube 11' is immersed in the liquid. At that time the fluid stream issuing from power nozzle 19' is deflected toward output passage 33' due to the back pressure developed in passage 35' by the rising liquid. The pressure signal is then received at control nozzle 37' so as to remove the NOR output signal from output passage 43' of OR/NOR gate 39'. Removal of the NOR signal results in removal of the control signal from control nozzle 61 of flip-flop 60; however, the power stream issuing from power nozzle 63 remains directed toward output passage 69 due to the bistable nature of flip-flop 60. Switch 71 thereby remains activated and pump 73 continues to supply fluid to the liquid level 13.

The rising liquid level eventually attains the level of the egress orifice of high level sensor tube 11" so as to block exhaust of the fluid stream issued from nozzle 19" to output passage 35". A back pressure develops switching the stream issued from nozzle 19" toward output passage 33" and thereby providing a control signal at control nozzle 37". This control signal causes a change in state of OR/NOR gate 39" so that a fluid signal is produces at OR output passage 45" which in turn provides a control stream at control nozzle 65 of bistable element 60. This control stream changes the state of bistable element 60 so that a stop signal appears in the form of the power stream received at output passage 67. Removal of the power stream from output passage 69 causes deactivation of pressure control switch 71 thereby turning off pump 73 which terminates supply of liquid.

Should the liquid level now fall below the level of high level sensor tube 11", flow in OR passage 45" will terminate. This does not change the state of flip-flop 60, but does render the flip-flop receptive to a start signal by removing the control stream from control nozzle 65. When the liquid level drops below the egress orifice of low level sensor tube 11', flip-flop 60 receives a control stream at control nozzle 61 by means of the NOR signal at passage 45'. Consequently, the flip-flop 60 changes state to provide a start signal at output passage 69 which activates switch 71 and pump 73 to once again begin filling the liquid receptacle. It is apparent that actuation of switch 71 may, in a practical system, be only one of several configurations that must be met before the pump is actuated. One of the other conditions that must be met could be a desire to refill the tank.

The above-described system illustrated in FIG. 2 therefore maintains the level of liquid 13 between the two levels determined by the positions of the egress orifice of sensor tubes 11' and 11".

While the present system is described as being utilized for sensing liquid level, in a broad sense it operates in response to opening and closing of a sensor tube, regardless of the opening and closing mechanism or object. The latter may then be not only a body of liquid, but may be a solid object such as the finger of an individual, a bimetal, a humidity sensor, the armature of a relay or solenoid, or a sensed object on proximity detection. Operation of the system can be adjusted so that the system responds to partial closure, instead of only to complete closure, although this represents a degradation of the desired operation in liquid level detection.

The low pressure flow issued from the sensor tube permits efficient operation since relatively small amounts of fluid are exhausted when the sensor tube is unblocked. Further, the low pressure exhaust from the sensor tube causes minimum disturbance in the sensing environment. These advantage obtain regardless of whether the sensor is utilized to detect liquid level or for other sensing and detecting applications.

referring specifically to FIG. 3 of the accompanying drawings there is illustrated a circuit for filling bottles on a control line and utilizing the liquid level sensor of FIG. 1. Four external signals must be supplied to the circuit from a conveyor mechanism (not illustrated) on which the bottles to be filled are located. A first signal, called a "bottle-in-place" signal, is applied to an input orifice 81 of a first monostable flp-flop 83. A second signal, "start-fill, " is applied to an input orifice 85 of a second monostable flip-flop 87. A "stop-fill" signal is applied to an orifice 89 of a further monostable flip-flop 91. Elements 83, 87, and 91 may be substantially the same as element 39 of FIG. 1. The "stop-fill" signal is generated a predetermined length of time after the "start-fill" signal for purposes to be described subsequently. The fourth input signal is from the sensor tube 11 of the liquid level sensor.

In operation, when a bottle is positioned for filling by the conveyor mechanism, the "bottle-in-place" and "start-fill" signals are applied to the flip-flops 83 and 87 respectively and fluid flow output signals are produced in the corresponding output channels 93 and 95. These flows are applied to input channels 97 and 99 respectively of a passive AND gate 101, which, for example, may take the form illustrated in U.S. Pat. No. 3,277,915.When both input signals are present flow is provided in AND output passage 103 of the passive AND gate. The fluid signal in passage 103 is applied to a control orifice 105 of a still further monostable flip-flop 107 to thereby inhibit the flow normally directed to output passage 109 thereof. Output passage 109 is connected to input passage 111 of a monostable flip-flop 115 and input passage 113 of a bistable flip-flop 117. Monostable flip-flop 107 and 115 may be substantially the same as element 39 of FIG. 1. Bistable flip-flop 117 may be substantially the same as that illustrated in U.S. Pat. No. 3,221,990.As a result of a loss of signal at input passage 111, monostable flip-flop 115 provides a fluid flow substantially immediately at its output passage 119. The signal which previously appeared at the input passage 113 of the flip-flop 117 caused the flow of the flip-flop be directed to a dump output channel 121. Removal of this signal from passage 113 does not of itself change the state of bistable element 117. However, flow at the output passage 119 of element 115 is applied to a control orifice 123 of the flip-flop 117 via a passage 125, and this changes the state of element 117, causing fluid to flow in outlet passage 127 of element 117. Fluid in passage 127 is applied to control passage 129 of element 115 to divert fluid away from outlet passage 119 thereof and hence remove fluid flow from control orifice 123 of element 125. Thus a fluid pulse appears in outlet passage 119 of element 115, the pulse having a duration determined primarily by the lengths of passage 113 and 125. It is apparent therefore, the monostable flip-flops 107 and 115, the bistable flip-flop 117, and the interconnected circuitry provide a leading edge pulse shaper. In summary, upon the generation of a fluid signal in AND output passage 103 of the passive adder 101 fluid flow in passage 109 is inhibited and flow in passage 119 is initiated. A predetermined length of time thereafter, regardless of the duration of the signal appearing in passage 103, flow is diverted away from passage 119. The pulse of predetermined duration is applied to an input passage 131 of a bistable flip-flop 133. Flip-flop 133 is substantially the same as flip-flop 117 and has two output channels: one output channel 135 is termed as the "-stop-fill" channel; the other output channel 137 is termed the "start-fill" channel. When a signal appears at input channel 131, flow in flip-flop 133 is diverted to channel 137 to initiate filling of a bottle. Filling continues until the sensing tube 11 has its end closed by the liquid level at which time elements 21 and 39 constituting the liquid level sensor of the present invention generate a signal at output channel 45 of the gate 39. The signal on the output channel 45 is applied to an input passage 139 of the flip-flop 133 so that flow therein is diverted to the output channel 135, or the "stop-fill" channel. The liquid dispensing mechanism (not illustrated) with which the apparatus FIG. 3 is utilized is obviously responsive to the "-start-fill" and "stop-fill" output signals to perform precisely those functions.

As indicated previously, there is a timed "stop-fill" signal applied to an input orifice 89 of a monostable flip-flop 91. If, for any reason, a "stop-fill" output signal is not received at channel 135 as a result of sensing liquid level by the tube 11, within a predetermined length of time after the "start-fill" signal is applied to the input orifice 85 of the monostable flip-flop 87, the mechanism with which the circuit of FIG. 3 is to be employed generates a "stop-fill" signal or flow which is applied to the orifice 89. Flow to orifice 89 causes the monostable flip-flop 91 to divert flow to associated output channel 141 which is applied to a further input channel 143 of the flip-flop 133. Flow at input channel 143 changes the state of flip-flop 133 and produces the "stop-fill" output signal at channel 135. Thus, even though the liquid level in a bottle does not reach the height of the egress orifice of tube 11, after a predetermined period of time the "stop-fill" output signal is automatically provided at channel 135 and filling stops. This mechanism is necessary in order to prevent filling a defective bottle, as where the bottom of a bottle is cracked or some small part of it is missing.

Also illustrated in FIG. 3 is a "blow-down" valve 151 connected in series between a high pressure fluid source and sensor tube 11 of the liquid level sensor. This valve is automatically actuable by means (not illustrated) associated with the mechanism employed with the circuit of FIG. 3 to blow high pressure fluid through sensor tube 11 during intervals between filling of successive bottles on the conveyor mechanism. The purpose of this "blow-down" feature is to clear the egress orifice of the sensor tube 11 of any sensed liquid which may adhere to the sensor tube. This step is preformed after filling of each bottle.

While I have described and illustrated one specific embodiment of my invention, it will be clear that variation of the details of construction which are specifically illustrated and described may be resorted to without departing from the spirit and scope of the invention as defined in the appended claims.

I claim:

1. A pure fluid system of the type wherein a predetermined condition in a given environment is sensed as a function of the impedance to fluid flow said condition produces in a sensor tube, said predetermined condition being of the type which is readily disturbed by the issuance of a stream of fluid into said given environment, said system being characterized by:

pure fluid switching means responsive to pressurized fluid applied thereto for flowing a fluid stream as the exclusive fluid flow through said sensor tube and into said environment whenever the fluid flow impedance produced in said sensor tube by said condition is below a predetermined impedance and for directing said stream away from said sensor tube whenever the fluid flow impedance produced by said condition is at least equal to said predetermined impedance;

means for applying fluid to said pure fluid switching means at a pressure which is sufficiently high to produce said fluid stream and sufficiently low that said stream does not significantly affect said condition and said environment; and output means responsive to said stream when directed away from said sensor tube for indicating whether the flow impedance in said sensor tube is below said predetermined impedance.

2. The combination according to claim 1 wherein said output means comprises a pure fluid logic element having means for issuing a power stream, a control nozzle for receiving the fluid stream from said pure fluid switching means when directed away from said sensor tube, and a pair of passages for selectively receiving said power stream as a function of the fluid pressure at said control nozzle, said power stream having a substantially higher pressure than the pressure of the fluid stream flowing in said pure fluid switching means.

3. The combination according to claim 2 wherein the pressure of said power stream is approximately 10 times the pressure of the fluid stream flowing in said pure fluid switching means and the liquid being sensed is water and the fluid applied to said sensing system is air.

4. A pure fluid system of the type wherein a condition in a given environment is sensed as a function of the impedance to fluid flow said condition produces in a sensor tube, said system characterized by:

pure fluid switching means responsive to pressurized fluid applied thereto for flowing a fluid stream as the exclusive fluid flow through said sensor tube and into said environment whenever the fluid flow impedance produced in said sensor tube by said condition is below a predetermined impedance and for directing said stream away from said sensor tube whenever the fluid flow impedance produces by said condition is at least equal to said predetermined impedance;

means for applying fluid to said pure fluid switching means at a pressure which is sufficiently high to produce said fluid stream and sufficiently low that said stream does not significantly affect said condition and said environment; and output means responsive to said stream when directed away from said sensor tube for indicating whether the flow impedance in said sensor tube is below said predetermined impedance;

wherein said condition being sensed is the level of a liquid, said sensor tube being disposed to direct the fluid stream flowing therethrough from an egress end of said tube toward the surface of the liquid level being sensed, the pressure of the fluid stream flowing through said sensor tube being sufficiently low as not to produce perturbations in the liquid when the liquid level is below the egress end of said tube.

5. The combination according to claim 4 wherein the fluid comprising said fluid stream is a gas.

6. The system according to claim 4 wherein is further provided means for blowing high pressure fluid through said sensor tube upon removal thereof from the liquid of which the level is sensed, said high pressure fluid being at a sufficiently high pressure to remove any of said liquid adhering to the interior of said sensor tube.

7. the system according to claim 6 further comprising means responsive to said output means for preventing addition of further liquid to the liquid being sensed whenever said liquid level achieves the height of the egress orifice of said sensor tube.

8. A fluid system comprising a liquid level sensor of the type wherein a stream of fluid is issued from an egress orifice of a sensor tube toward the surface of the liquid, the impedance to fluid flow through said sensor tube being varied as a function of the liquid level being sensed, said system being characterized by:

pure fluid switching means including an input nozzle for issuing a stream of fluid in response to pressurized fluid applied thereto, a first output passage for receiving said stream of fluid in the absence of a back pressure therein above a predetermined pressure, and a second output passage for receiving said stream of fluid only in response to a back pressure above said predetermined pressure in said first output passage;

means for interconnecting said first output passage and said sensor tube such that only fluid issued by said input nozzle and received by said first output passage is directed toward the surface of said liquid;

means for applying fluid to said input nozzle at a pressure which is sufficiently high to produce said stream of fluid and sufficiently low as not to produce perturbations in said liquid.

9. The combination according to claim 8 further comprising a pure fluid logic element comprising: a power nozzle responsive to pressurized fluid applied thereto for issuing a power stream, a control nozzle connected to said second output passage of said pure fluid switching means to receive said stream of fluid therefrom, first output means disposed to receive said power stream only in the absence of said stream of fluid at said control nozzle, and second output means disposed to receive said power stream only in the presence of said stream of fluid at said control nozzle; and means for applying pressurized fluid to said power nozzle at a pressure which is substantially higher than the pressure applied to said pure fluid switching means.

10. The combination according to claim 9 wherein said pressurized fluid is a gas.

11. The combination according to a claim 10 wherein the predetermined pressure required to produce flow in said second output passage is achieved only when the egress end of said sensor tube is immersed in the liquid.

12. The system according to claim 11 further comprising:

a second substantially identical liquid level sensor, the sensor tube of said second liquid level sensor having its egress orifice disposed at a higher level than the egress orifice of the sensor tube in the first-mentioned liquid level sensor;

a bistable device;

means responsive to power stream flow at said second output means of said first-mentioned liquid level sensor for transferring said bistable device to a first stable state; and means responsive to power stream flow at the first output means of said second liquid level sensor for transferring said bistable device to a second stable state.

13. The system according to claim 12 further comprising means responsive to said first stable state for adding liquid to the liquid being sensed whereby to raise the level thereof.

14. In a system for sequentially filling containers with fluid material wherein a start signal is provided whenever a filling operation for a container is to be initiated, a control circuit for initiating said filling operation and terminating same when the fluid material in a container being filled reaches a predetermined level, said control circuit comprising:

a fluidic liquid level detector comprising: a sensor tube having an upstream end and a downstream end, said downstream end extending to said predetermined level in said container being filled; fluidic switching means comprising the exclusive means for flowing pressurized fluid through said sensor tube from said upstream and to said downstream end whenever the level of fluid material in said container being filled is below said predetermined level and for preventing said pressurized fluid from flowing through said sensor tube whenever the fluid material in said container being filled is at or above said predetermined level, said pressurized fluid being at a sufficiently low pressure as not to produce perturbations in the fluid material in said container being filled; and means responsive to the prevention of pressurized fluid flow through said sensor tube for providing a first signal;

circuit means responsive to said start signal for providing a signal pulse; and bistable means for assuming a first stable state in response to said signal pulse and a second stable state in response to said first signal.

15. The control circuit according to claim 14 wherein said system additionally provides a container-in-place signal, and wherein said circuit means includes means responsive to the provision of said start signal and container-in-place signal in time coincidence for providing said signal pulse.

16. The control circuit according to claim 14 further comprising means for selectively flowing high pressure fluid through said sensor tube.

17. The method of sensing when liquid in a container reaches a predetermined level, said method employing a sensor tube having one end disposed at said predetermined level, said method comprising the steps of:

a. flowing pressurized fluid through said sensor tube and out said one end thereof whenever said one end is unblocked by said liquid, the pressure of said fluid being sufficiently low as not to cause perturbations in said liquid;

b. preventing flow of said pressurized fluid into said sensor tube whenever said one end thereof is blocked by said liquid; and c. detecting the prevention of fluid flow into said sensor tube.

18. The method according to claim 17 wherein step b. includes the step of redirecting pressurized fluid flow through a fluid passage whenever said one end of sensor tube is blocked by said liquid, and wherein step c. includes the step of sensing flow of said pressurized in said fluid passage.